J. J. McCOURT.
ICE CREAM FREEZER.
APPLICATION FILED NOV. 13, 1916.
1,293,139.
Patented Feb. 4, 1919.
2 SHEETS—SHEET 2.
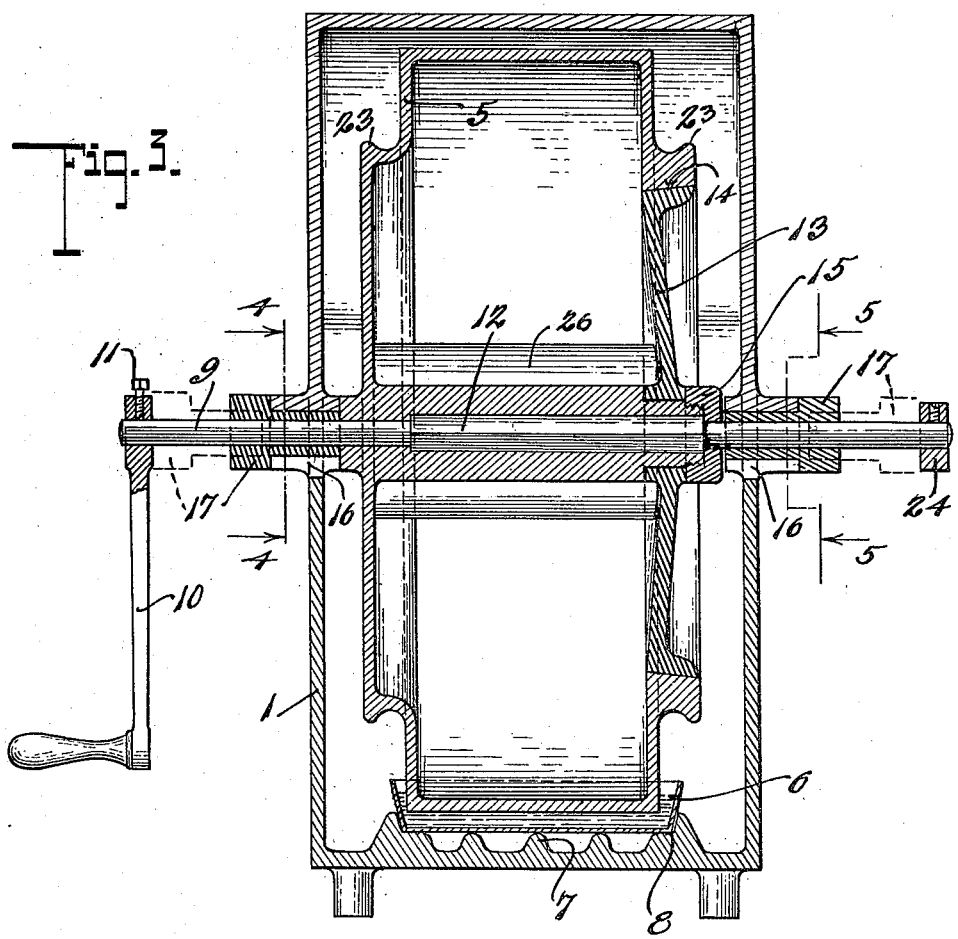
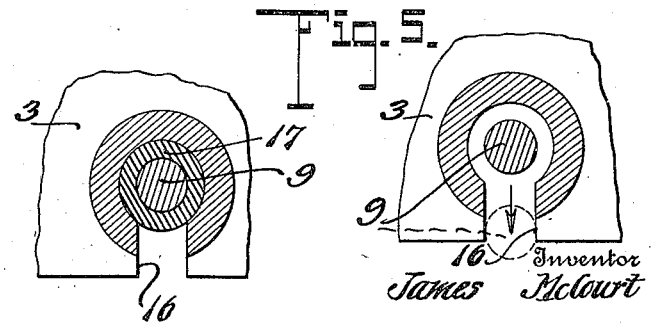
Witness
E. H. Wagner.
Inventor
James McCourt
By Robt H Cobb
Attorneys

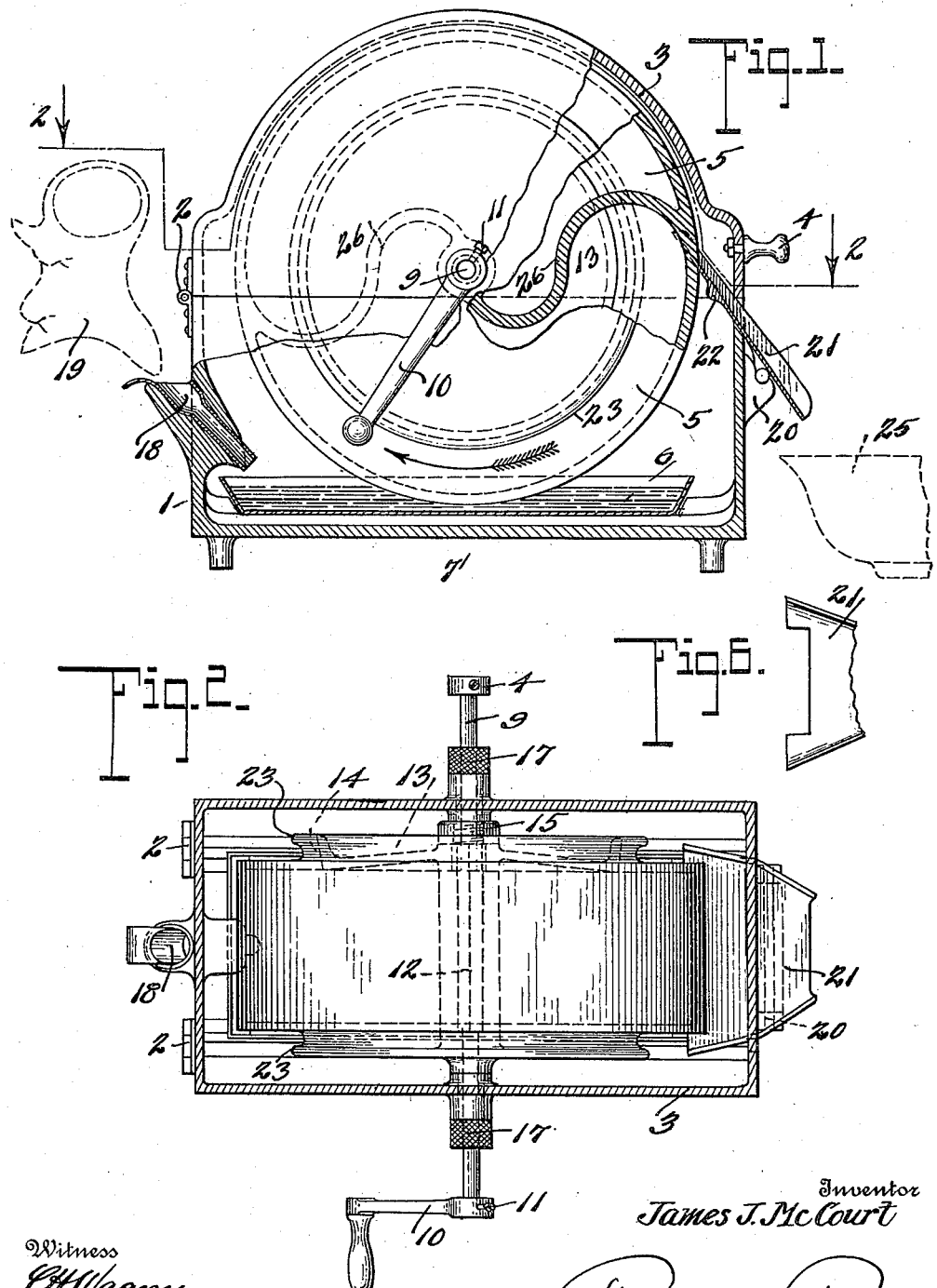

UNITED STATES PATENT OFFICE.

JAMES J. McCOURT, OF LANSING, MICHIGAN.

ICE-CREAM FREEZER.

1,293,139.  Specification of Letters Patent.  Patented Feb. 4, 1919.

Application filed November 13, 1916. Serial No. 131,077.

*To all whom it may concern:*

Be it known that I, JAMES J. McCOURT, a citizen of the United States, residing at Lansing, in the county of Ingham and State of Michigan, have invented certain new and useful Improvements in Ice-Cream Freezers, of which the following is a specification.

The present invention appertains to improvements in that type of freezers, designed for instance for performing a continuous freezing operation of ice cream, embodying a revoluble container in which is carried the freezing or cooling agent and arranged to contact with the material to be cooled whereby said material is rapidly congealed on the outer surface of said container, and a scraper device coöperating with the surface aforesaid to remove the consolidated material as desired.

It is the object of this invention to provide such a device as this in which the parts are so formed and disposed as to permit the apparatus to be kept perfectly sanitary, the parts being easily accessible for cleansing purposes. It is further an object in view to protect the material to be frozen both before and after freezing against contamination by, or admixture with, condensed moisture which forms on the walls of the container during use of the device.

In the construction of the invention a housing for the container holding the freezing agent is employed and another object in view is the mounting of said container in the housing so as to permit displacement of said container with relation to a receptacle, disposed in said housing and in which the material to be frozen is contained, by opening movement of the housing cover, and still further to provide for the ready removal of said container from its mounting.

With the above and other objects in view, this invention consists in the construction, combination and arrangement of parts all as hereinafter more fully described, claimed and illustrated in the accompanying drawings, wherein:

Figure 1 is a side elevation of an apparatus constructed in accordance with this invention, parts being broken away and shown in section to disclose more clearly the details of construction.

Fig. 2 is a horizontal sectional view on the line 2—2 of Fig. 1.

Fig. 3 is a vertical sectional view through the apparatus, showing more clearly the journal means for the freezing drum used in this apparatus.

Figs. 4 and 5 are enlarged vertical sectional views on the lines 4—4 and 5—5 respectively of Fig. 3.

Fig. 6 is a fragmentary view showing the upper portion of the scraper member.

Throughout the following detail description, and on the several figures of the drawings, similar parts are referred to by like reference characters.

Referring to the drawings and specifically describing the invention, 1 designates an outer casing or housing of suitable size and configuration having hingedly connected at 2 a cover member 3 provided at its forward end with a handle or knob 4 to facilitate opening or raising and closing operation of said cover member. The numeral 5 indicates a drum which is mounted within the housing above referred to and is adapted to contain the freezing agent such as ice, salt, etc. This container is of drumlike form and has its peripheral portion arranged to extend into the pan or receptacle 6, for holding the material to be frozen, disposed upon the base of the housing 1. As shown most clearly in Fig. 3, said receptacle 6 is held slightly spaced from the interior base portion of the housing 1 by suitable corrugations or ribs 7, the outer ones of which are suitably formed with seats 8 on which the said receptacle is arranged. The drum 5 is mounted upon a shaft 9 which is fixed in relation to the drum so that upon actuation of the shaft, as by means of the handle 10 detachably connected to an end of the shaft by the fastening member 11, the drum may be rotated.

In the construction disclosed in the drawing, the shaft is preferably formed with an enlarged central portion of rectangular shape in cross section for the above-mentioned purpose, as indicated at 12. The drum 5 is provided with a lateral closure member 13 which is of special form in that the material of the cover bulges outwardly toward its center and its peripheral edge is constructed on a bevel as indicated at 14 to correspond with a similar formation of the mouth of the drum, all of which is designed to strengthen the cover and enable a tight closing of the same to prevent leakage of the contents of the container. This cover is effectively held in place by a lock nut 15 which is received by the threaded central portion of the drum and said nut, furthermore, holds the shaft 12 against displacement from operative relation with respect to the drum.

A particular feature of my invention is the mounting of this drum 5 upon the cover 3 of the housing for in so disposing said element I am enabled to displace the drum upon movement of said cover. To this end the opposite edges of the cover are formed with open ended slots 16 in the upper enlarged portion of which slidable bearing members 17 carried on the shaft 9 are seated. These bearing members 17, for instance, are slidable outwardly on the shaft 9 into the dotted line positions such as shown in Fig. 3 whereupon the shaft 9 may be moved from the slots 16 as indicated most clearly in Fig. 5 of the drawing. In this manner the drum is quickly displaced from its mounting as when it is desired to fill or cleanse the same and the assembly or disposition of the drum within the housing is just as easily effected by the reverse of the foregoing operation. It therefore, follows that whenever it is desired in the use of the apparatus to gain access to the cream pan 6 it is only necessary to lift the cover 3 by its handle 4 for this purpose and the closing of said cover disposes the drum 5 in the housing so that its peripheral portion will extend into the cream pan and into the material to be frozen contained thereby.

At one side of the receptacle a passage extends through the wall and in this passage is seated a removable spout of tubular form, indicated by the numeral 18. Through this spout which practically constitutes a funnel, the cream or material to be frozen may be poured as from a pitcher indicated in dotted lines at 19. Obviously the tube 18 may be easily displaced from its seat when it is desired to cleanse the same. At the opposite side preferably of the housing 1, a bearing bracket 20 is formed upon which is pivotally seated a combined scraper and chute 21, the upper end of which projects into the housing and is weighted as indicated at 22 to normally hold its upper extremity against the outer peripheral surface of the drum 5. This upper extremity as shown in Figs. 2 and 6 extends slightly beyond the periphery of the drum at each side so as to effectively remove not only the consolidated material adhering to the surface but also from the side walls directly adjacent to said surface.

I desire it to be understood that I am aware of the fact that it has heretofore been proposed to provide a freezing apparatus of this general type but in such apparatus provision is not made for preventing the contamination of the material which adheres to the freezing surface in the use of the device by moisture which condenses on the side walls of the drum and, therefore, one of the essential characteristics of this invention is the formation of the drum 5 with what I term for the purposes of this description drip collecting means. Said means comprise the lateral annular flanges 23 and these flanges it is to be noted project beyond the side walls of the cream pan 6 so that the drippings are not only prevented from running outwardly from the axis of the drum on to the peripheral portions carrying the consolidated or frozen materials but such drippings are deposited on to the base of the housing. Advantage is taken of this deposit of the condensed moisture on the base by the spacing of the cream pan from the base so that liquid will pass beneath the pan as it collects where it acts as a cooling agent for the contents of said pan, making for a more effective accomplishment of the freezing operation. The apparatus thus provided will obviously be quite sanitary.

It may be noted that the shaft 9 at the end opposite that carrying the handle or crank 10 is provided with an adjustable stop 24 limiting movement of the slidable bearing sleeve 17 as is the function also with regard to the crank just mentioned.

It is only necessary to add that in the use of the apparatus the drum is rotated and the cream during such rotation adheres to the peripheral portion of the drum from which it is scraped by the scraper member 21, which acting as a chute directs the congealed or consolidated material into a suitable receptacle or dish 25 therebeneath.

The drum is preferably provided with an interior recurving partition or partitions indicated at 26 which are designed to prevent the shifting of the freezing agent in the rotation of the drum, enabling the revolving of the drum steadily in a continuous movement.

Having thus described my invention, what I claim as new is:

1. In apparatus of the class described, the combination of a container for holding a refrigerating agent, a receptacle in which is disposed the material to be cooled by contact with the surface of said container, a device arranged to contact with the surface of the container to effect removal of the consolidated material therefrom, said container having means to prevent liquid condensing on its sides from reaching the surface thereof carrying the congealed material.

2. In apparatus of the class described, the combination of a container for holding cooling or freezing agent, a receptacle to receive the material to be frozen and into which the container extends to contact with said material, said container having lateral flanges arranged in spaced relation to the periphery of the container and adapted to prevent liquid passing from its walls into the receptacle.

3. In apparatus of the class described, the combination of a container for holding a refrigerating agent having annular drip flanges adjacent to its peripheral portion, a receptacle for containing the material to be cooled arranged within the limits of said flanges whereby moisture collecting on the surface of said first-mentioned container will be directed away from the material receptacle aforesaid.

4. In apparatus of the class described, the combination of a freezing drum, a receptacle for containing material to be frozen arranged beneath the drum and into which the peripheral portion of the drum projects, a support for said receptacle having means for holding the receptacle spaced from the surface, drip collecting means on the drum extending beyond the sides of the receptacle for directing the moisture condensed on its walls over the receptacle on to the surface of said support whereby said condensed liquid may pass beneath the receptacle and act as a cooling agent for the contents thereof.

5. In combination, a freezing drum, a housing in which said drum is mounted, the interior base surface of said housing having spacing elements thereon, a pan for holding the material to be frozen disposed on said elements beneath the drum and into which the drum projects for contact with said material, and drip collecting means for directing the condensed moisture on the walls of said drum away from said receptacle and on to the base of said housing.

6. In combination, a freezing drum, a housing, a shaft for actuating said drum, and bearing members carried by said shaft and connecting the same to the housing, said bearing members being displaceable longitudinally of the shaft to disconnect the same from the housing and permit displacement of the shaft and drum therefrom.

7. In combination, a freezing drum, a housing, the side walls whereof are provided with open ended slots constituting bearings, bearing members mounted on the shaft and adapted for disposition in the slots to interlock the shaft with the housing, said members being shiftable laterally to effect release of the shaft for removal of the same from the slots aforesaid.

8. In combination, a freezing drum, a housing for said drum, a cover for said housing hingedly connected thereto, said cover having open ended slots formed in its side walls, a shaft on which said drum is mounted and disposed in the cover slots aforesaid and bearing sleeves slidably mounted on the shaft and disposed in the slots for interlocking the shaft with the housing cover whereby on movement of said cover the drum is carried therewith.

9. In combination, a freezing drum, a housing in which said drum is mounted, a shaft for actuating the drum journaled in said housing, a closure member for said drum through which the shaft extends, and means for holding said closure member in closed position and preventing displacement of the drum with respect to the shaft.

10. In combination, a freezing drum for holding a freezing agent, said drum having a central laterally projecting threaded portion, a housing in which said drum is mounted, a shaft on which the drum is mounted journaled in the housing, a closure member for said drum through which the shaft extends, and a nut mounted upon the central threaded portion aforesaid for coöperation with the closure member to hold the same in position and prevent displacement of the drum from the shaft.

In testimony whereof I affix my signature.

JAMES J. McCOURT.